United States Patent
Malinowski

(10) Patent No.: US 6,847,463 B2
(45) Date of Patent: Jan. 25, 2005

(54) METHOD AND APPARATUS FOR DETECTING THE PRESENCE AND THICKNESS OF CARBON AND OXIDE LAYERS ON EUV REFLECTIVE SURFACES

(75) Inventor: Michael E. Malinowski, Livermore, CA (US)

(73) Assignee: EUV, LLC, Santa Clara, CA (US)

(*) Notice: Subject to any disclaimer, the term of this patent is extended or adjusted under 35 U.S.C. 154(b) by 287 days.

(21) Appl. No.: 10/163,477

(22) Filed: Jun. 5, 2002

(65) Prior Publication Data

US 2003/0227636 A1 Dec. 11, 2003

(51) Int. Cl.[7] .......................... G01B 11/28; G01N 21/55
(52) U.S. Cl. ...................................... 356/630; 356/445
(58) Field of Search .................. 356/630, 445–446, 356/237.2; 438/16

(56) References Cited

U.S. PATENT DOCUMENTS 6,533,952 B2 * 3/2003 Klebanoff et al. ............ 216/67
6,597,463 B1 * 7/2003 Singh et al. .................. 356/630
6,727,995 B1 * 4/2004 Halliyal et al. ............... 356/630
2002/0085214 A1 * 7/2002 Dautartas et al. ............. 356/630
2002/0145740 A1 * 10/2002 Meeks ......................... 356/630

* cited by examiner

Primary Examiner—Zandra V. Smith
(74) Attorney, Agent, or Firm—Fliesler Meyer LLP

(57) ABSTRACT

The characteristics of radiation that is reflected from carbon deposits and oxidation formations on highly reflective surfaces such as Mo/Si mirrors can be quantified and employed to detect and measure the presence of such impurities on optics. Specifically, it has been shown that carbon deposits on a Mo/Si multilayer mirror decreases the intensity of reflected HeNe laser (632.8 nm) light. In contrast, oxide layers formed on the mirror should cause an increase in HeNe power reflection. Both static measurements and real-time monitoring of carbon and oxide surface impurities on optical elements in lithography tools should be achievable.

27 Claims, 1 Drawing Sheet

METHOD AND APPARATUS FOR DETECTING THE PRESENCE AND THICKNESS OF CARBON AND OXIDE LAYERS ON EUV REFLECTIVE SURFACES

This invention was made with Government support under Contract No. DE-AC04-94AL85000 awarded by the U.S. Department of Energy to Sandia Corporation. The Government has certain rights to the invention.

FIELD OF THE INVENTION

This invention relates generally to a laser device for detecting carbon and oxide materials on surfaces that are reflective of extreme-ultraviolet radiation and especially to a device for measuring the thicknesses of such materials on Mo/Si multilayer mirrors.

BACKGROUND OF THE INVENTION

The present state-of-the-art for Very Large Scale Integration ("VLSI") involves chips with circuitry built to design rules of 0.25 $\mu$m. Effort directed to further miniaturization takes the initial form of more fully utilizing the resolution capability of presently-used ultraviolet ("UV") delineating radiation. "Deep UV" (wavelength range of $\lambda=0.3$ $\mu$m to 0.1 $\mu$m), with techniques such as phase masking, off-axis illumination, and step-and-repeat may permit design rules (minimum feature or space dimension) of 0.18 $\mu$m or slightly smaller.

To achieve still smaller design rules, a different form of delineating radiation is required to avoid wavelength-related resolution limits. One research path is to utilize electron or other charged-particle radiation. Use of electromagnetic radiation for this purpose will require extreme ultraviolet (EUV) and x-ray wavelengths. Various EUV and x-ray radiation sources are under consideration. There include, for example, (1) the electron ring synchrotron, (2) laser plasma source, (3) discharge plasma source, and (4) pulsed capillary discharge source. Some of the current sources of EUV eject debris that tend to coat optics used in photolithography which ultimately reduces efficiency.

In the next-generation of Extreme Ultraviolet Lithography (EUVL), multilayer based optics and masks will also be subject to carbon contamination. Carbon buildup on optical surfaces exposed to a combination of low-pressure hydrocarbon vapors and radiation is a well-known phenomenon particularly in synchrotron beamline optical systems. This carbon contamination absorbs radiation and results in the undesirable reduction in power in the optical system. In EUVL systems, such carbon buildup would cause a loss in power available for exposing wafers and corresponding drop in wafer exposure throughput. Oxidation of the optical surfaces in EUVL systems is another phenomenon that causes power reduction in the optical system.

SUMMARY OF THE INVENTION

The present invention is based in part on the recognition that the intensity of coherent light reflecting from carbon deposits and oxide deposits formed on highly reflective surfaces such as Mo/Si mirrors can be quantified. Specifically, it has been shown that the presence of carbon deposits on a Mo/Si multilayer mirror decreases the intensity of reflected HeNe laser (632.8 nm) light. Conversely, it is expected that oxide layers formed on the mirror will cause an increase in the intensity of reflection. These characteristics can be employed in a simple laser-based technique to discriminate between carbon and oxide layers as well as measure their thicknesses.

In one embodiment, the invention is directed to a method for detecting carbon deposits and/or oxide deposits on the surface of a substrate that includes the steps of:

(a) selecting a detection radiation such that (i) the intensity of the detection radiation that is reflected from the carbon deposits is lower than the intensity of detection radiation that is reflected from a bare surface of the substrate which does not contain either carbon or oxide deposits, and (ii) the intensity of the detection radiation that is reflected from the oxide deposits is higher than the intensity of detection radiation that is reflected from a bare surface;

(b) irradiating the surface of the substrate with incident detection radiation which has a first intensity level;

(c) measuring the intensity level of the reflected detection radiation from the surface which has a second intensity level; and (d) calculating the difference between the first intensity level and the second intensity level to detect the presence of carbon deposits and/or oxide deposits.

In another embodiment, the invention is directed to a method for detecting the presence of carbon deposits and/or oxide deposits on the surface of an optic that is highly reflective of extreme ultraviolet radiation that includes the steps of:

(a) irradiating the surface of the optic with incident coherent radiation having a wavelength of about 633 nm and having a first intensity level;

(b) measuring the intensity of the reflected radiation from the optic which is at a second intensity level; and (c) calculating the difference between the first and second intensity levels.

In preferred embodiments, the inventive methods include establishing a correlation between measured reflected intensities and deposit thicknesses. This information provides static measurements and real-time monitoring of carbon and oxide surface impurities on optical systems.

In a further embodiment, the invention is directed to an apparatus for detecting substrate surface contaminants containing carbon deposits and/or oxide deposits that includes:

(a) a source of radiation such that (i) the intensity of the detection radiation that is reflected from the carbon deposits is lower than the intensity of detection radiation that is reflected from a bare surface of the substrate, which does not contain either carbon or oxide deposits, and (ii) the intensity of the detection radiation that is reflected from the oxide deposits is higher than the intensity of detection radiation that is reflected from a bare surface;

(b) means for measuring the intensity of radiation that is reflected from the substrate surface and to a generate signal that corresponds to the intensity of the radiation measured; and (c) means for correlating the signal to the presence of the carbon deposits and/or oxide deposits.

DESCRIPTION OF PREFERRED EMBODIMENTS

Figure 1:
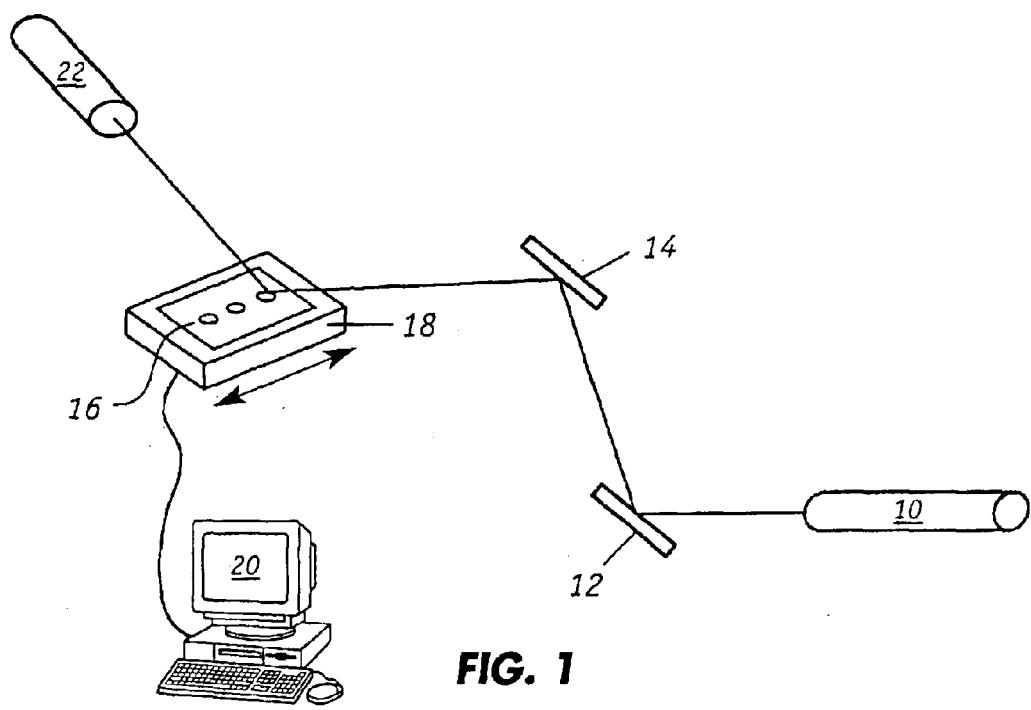
FIG. 1 illustrates a device for scanning mirror samples with a laser and measuring the radiation reflected therefrom.

FIG. 1 shows the experimental arrangement that was employed to scan mirror samples with a coherent light source. The mirrors were coated with carbon contaminants as further described herein. As shown, light from a Class IIIA, intensity-stabilized HeNe laser 10 made by Spectra Physics, Model 117A was directed by two turning mirrors 12, 14 to strike mirror sample 16 at an angle of incidence of approximately 45 degrees. Mirror 16 was placed on a linear stage 18 which was moved manually in a direction that was perpendicular to the plane of incidence/reflection of the light. Light reflected from the mirror 16 was detected by a photodiode system 22 which consisted of a Newport 818-SL detector and Newport 1825-C detector power supply/meter. A bandpass optical filter (632.8 nm nominal) from Edmund Scientific (A30 910) was positioned in front of the photodiode detector to minimize stray light effects. Stage 18 can also be a motor actuated stage that has suitable rotational, translational, and longitudinal controls for precise maneuvers and alignments. In this embodiment, scanning operation, can be controlled with computer 20. Calibration data, for example, can be stored in the computer and scanning/rastering can be synchronized.

The nominal beam diameter of the HeNe light (632.8 nm) at the mirror was estimated to be about 1–2 mm based on the manufacturer's beam diameter and divergence specifications. The beam diameter was about the same as that of the carbon spots on the mirror surface which were measured with a metallurgical microscope to be about 1.50 mm. Although the laser was intensity stabilized (to about 0.1% based on specification), no care was taken to optimize system geometry, laser spot size, choice of photodiode or polarization of the HeNe light relative to the mirror surface. It should be noted that the size of the incident laser beam diameter will affect the sensitivity of the technique. Specifically, a carbon or oxide deposit whose surface area is smaller than the cross-section of the incident laser beam will not be as readily detected than larger sized deposits.

The mirror samples consisted of 40 bilayer pairs of molybdenum (Mo) and silicon (Si) that were deposited on a silicon wafer. Each mirror was made such that the peak reflectance occurred at an incident angle of 15° from sample normal for EUV radiation of 13.34 nm wavelength (92.3 eV). The bilayer thickness for the mirror, i.e., the sum of Mo and Si layer thicknesses was 7.13 nm and the Mo/(Mo+Si) thickness ratio was 0.40.

Discrete carbon spots were deposited on the mirror surfaces by exposing mirror surfaces simultaneously to EUV radiation and hydrocarbon vapors. The carbonaceous deposits were visibly darker in color than the base mirror surface. The source of EUV employed was the synchrotron undulator beamline source (CXRO beamline 12.0.1.2 at the Advanced Light Source, Lawrence Berkeley National Laboratory) operating at a wavelength of 13.4 nm with a bandwidth $\lambda/\Delta\lambda$ of about 200. The synchrotron is constructed from a storage ring providing for relativistic electrons confined by magnetic fields to a repeating orbital path.

Five carbon spots were deposited using the same EUV power (about 0.3 mW/mm$^2$, 92.3 eV) and hydrocarbon partial pressure conditions. The constancy of the hydrocarbon partial pressure was measured by in-situ residual gas analysis with a residual gas analyzer operating between 1–200 atomic mass units (AMU). The only process variation was the length of the exposure time of the mirror to the EUV radiation and hydrocarbon vapor. After formation of the carbon deposits, the intensity of reflected the HeNe light from the individual mirror spots was measured using the device shown in FIG. 1. (The scanning was done manually.) In addition, sputter-through Auger Electron Spectroscopy was performed on the carbon spots to measure their thicknesses. Initial experiments suggest that carbon and oxide layers as thin as 50 nm or less can be detected. The thicknesses of the carbon deposits formed on the mirror were proportionate to the different exposure times. The carbon deposits reflected less HeNe light than did the base mirror surface and there is an inverse linear correlation between exposure time, i.e., carbon deposit thickness, and reflectance intensity for the individual carbon spots as shown in FIG. 2.

Figure 2:
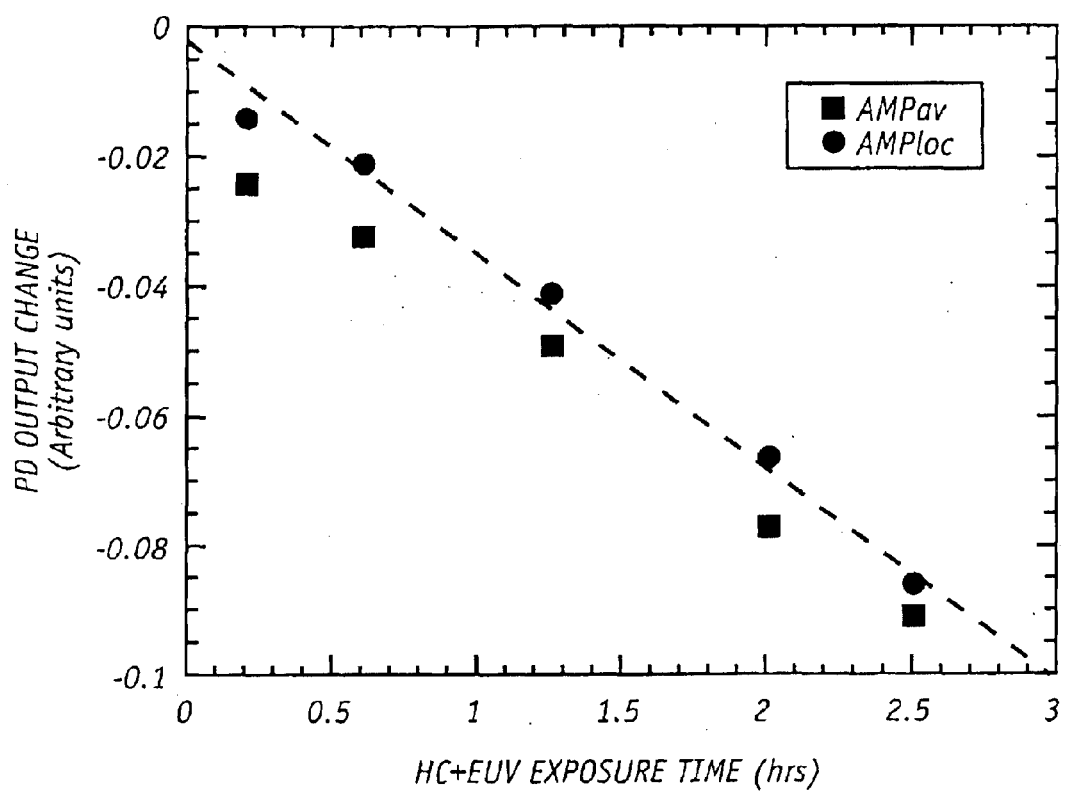
FIG. 2 is a graph of reflected laser light intensity verses exposure time to hydrocarbon vapors and EUV on mirrors.

FIG. 2 shows the results of using two different techniques that measured the (i) average amplitude ("AMPav" in FIG. 2) and the (ii) local amplitude (AMPloc" in FIG. 2) of the decrease in reflected HeNe power (PD) reflected from the carbon-contaminated multilayer. As is apparent, both methods produced essentially the same result which is that the decrease in light reflected (Y axis) is linearly related to the EUV and hydrocarbon (HC) exposure time or carbon thickness.

Mirror surfaces were also oxidized by exposure to EUV and oxygen-bearing compound, such as oxygen or water vapor. It was found that the oxidized areas were lighter in color than the base mirror. It is expected that oxidized regions on mirror surfaces will show a positive linear correlation between exposure time, i.e., oxidized region thickness, and reflectance intensity.

As is apparent, the invention can be employed to detect the presence of and/or measure the thicknesses of carbon deposits, oxidized deposits or regions, or both on mirror surfaces. In the first two situations where only one material is of interest, this can be achieved by correlating the thickness of the material of interest to the decrease or increase in reflection of radiation. In the last scenario where there are two different materials that are of interest, it may be necessary to select suitable parameters, e.g., radiation wavelength, so that radiation reflectance is enhanced by one material but is reduced by the other.

As demonstrated above, when the mirror surface is highly reflective of EUV radiation, reflectance of coherent radiation (632.8 nm) from a HeNe laser is reduced by carbon deposits but reflectance should be enhanced by oxide deposits. Typically, EUV reflective mirrors comprise multilayer stacks that are designed for peak reflectivity at a particular EUV wavelength. The multilayer reflection stack is formed of alternating layers of two or more materials. Preferred materials include, for example, molybdenum (Mo), silicon (Si), tungsten (W), carbon (C), beryllium (Be), ruthenium (Ru), $B_4C$, $Mo_2C$, titanium (Ti), and vanadium (V). Preferred stacks are formed from alternating layers of two materials that are selected from the following list of seven pairs: Mo—Si, W—C, Mo—Be, Ru—$B_4C$, $MO_2C$—Si, Ti—C, V—C. Alternating layers of Mo and Si are particularly preferred for EUV applications (e.g., on the order of 10 nm). The individual layers of the multilayer stack are formed by conventional techniques such as magnetron or ion-beam sputtering, thermal evaporation, electron beam deposition or electroless chemical deposition.

It is understood that the number of bilayers in the reflective multilayer can vary depending on the desired performance in terms of wavelength and bandwidth. A larger number of layers will provide higher reflectivity at the cost of lower angular and energy/wavelength bandwidth. For the multilayer reflection stack, the number of layered pairs will typically range from about 10 to 200 and preferably from about 20 to 80. Moreover, the layer pairs will typically have a bilayer periodicity of about 2 nm to 100 nm and preferably from about 5 nm to 30 nm. By "periodicity" is meant the thickness of one bilayer. Typically, the height of the individual stack layers will range from about 0.2 to 0.8 times the total bilayer thickness and preferably from about 0.4 to 0.6 times the total bilayer thickness.

If the mirror to be tested is not a multilayer structure comprising Mo/Si bilayers, it may be necessary to select radiation having a suitable wavelength (other than 632.8 nm) such that reflection is enhanced by one material and reduced by the other so that the materials, i.e., carbons and oxides, can be distinguished. This optimization process can be readily achieved using the device shown in FIG. 1 but the radiation source would be one emitting radiation of different desired wavelengths.

The present invention is particularly suited for inspecting or monitoring the optics, e.g., mirrors, in EUVL systems. In one embodiment, the invention could be implemented as a scanning technique to monitor the near-surface contamination both individual optical elements and an entire EUVL optical system in-situ. Scanning can be achieved by mounting the mirrors (and/or the radiation source) on stages which have rapid translation control. For applications such as EUV photolithography where the radiation sources must be placed in vacuum, the stages are preferably in-vacuum motor actuated or manually actuated with vacuum feed-throughs. Rapid precision stage assemblies are known in the art and are as described, for example, in U.S. Pat. Nos. 5,623,853 and 5,699,621 which are incorporated herein by reference. In this fashion, for example, a HeNe laser beam is scanned across an EUV optic with carbon and/or oxide contamination. By rastering the scan and simultaneously detecting the reflectance, a two-dimensional map of the contamination on the optic can be generated. In addition, since the reflectance decreases with carbon contamination and increases with oxidation, discrimination between these two dominant types of surface contamination is possible. Uncontaminated regions of the optic are also scanned to provide provide local calibration of the reflected laser light. By measuring the differences between these "clean" regions with nearby carbon- or oxide-coated regions, local differential measurements are obtained.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method for detecting carbon deposits and/or oxide deposits on the surface of a substrate that comprises the steps of: (a) selecting a detection radiation such that (i) the intensity of the detection radiation that is reflected from the carbon deposits is lower than the intensity of detection radiation that is reflected from a bare surface of the substrate, which does not contain either carbon or oxide deposits, and (ii) the intensity of the detection radiation that is reflected from the oxide deposits is higher than the intensity of detection radiation that is detected from a bare surface; (b) irradiating the surface of the substrate with incident detection radiation which as a first intensity; (c) measuring the intensity level of the reflected detection radiation from the surface which has a second intensity level; and (d) calculating the difference between the first intensity level and the second intensity level to detect the presence of carbon deposits and/or oxide deposits.

2. The method of claim 1 wherein the substrate has a surface that is reflective of extreme-ultraviolet radiation.

3. The method of claim 2 wherein the substrate surface comprises a multilayer reflective film.

4. The method of claim 3 wherein the multilayer reflective film comprises about 10 to 200 layer pairs.

5. The method of claim 4 wherein the layer pairs have a periodicity of 2 nm to 100 nm.

6. The method of claim 3 wherein the multilayer reflective film comprises alternating layers of molybdenum and silicon.

7. The method of claim 1 wherein the detection radiation is coherent radiation with a wavelength of about 633 nm.

8. The method of claim 1 wherein step a comprises scanning the surface of the substrate with the detection radiation.

9. The method of claim 1 wherein step a comprises irradiating the surface of the substrate with radiation from a laser.

10. The method of claim 1 further comprising calibrating the second intensity levels to the thicknesses of the carbon deposits and/or oxide deposits which comprises the steps of: (i) irradiating a bare area of the surface of a substrate that does not contain carbon deposits or oxide deposits with the detecting radiation; (ii) measuring the intensity of the detection radiation that is reflected from a bare area; (iii) irradiating a plurality of regions on the surface of a substrate that contain carbon deposits or oxide deposits in the regions with the detection radiation with has a known intensity level; (iv) measuring the intensities of the detection radiation that is reflected from selected carbon deposits or oxide deposits; and (v) measuring the corresponding thicknesses of the selected carbon deposits or oxide deposits.

11. The method of claim 10 wherein the detection radiation is coherent radiation with a wavelength of about 633 nm.

12. A method for detecting the presence of carbon deposits and/or oxide deposits on the surface of an optic that is highly reflective of extreme ultraviolet radiation that comprises the steps of: (a) irradiating the surface of the optic with incident coherent radiation having a wavelength of about 633 nm and having a first intensity level; (b) measuring the intensity of the reflected radiation from the optic which is at a second intensity level; and (c) measuring the difference between the first and second intensity levels.

13. The method of claim 12 further comprising calibrating second intensity level measurements to thicknesses of the carbon deposits and/or oxide deposits that comprises the steps of: (i) irradiating a bare area of the surface of an optic that does not contain carbon deposits or oxide deposits with the coherent radiation with a known intensity level; (ii) measuring the intensity of the coherent radiation that is reflected from the bare area; (iii) irradiating a plurality of regions on the surface of an optic that contain carbon deposits or oxide deposits in the regions with the coherent radiation with has a known intensity level; (iv) measuring the intensities of the coherent radiation that is reflected from selected carbon deposits or oxide deposits; (v) measuring the corresponding thicknesses of the selected carbon deposits or oxide deposits; and (vi) developing a functional relationship between the intensities of the reflected coherent radiation and the thicknesses of the carbon deposits and/or oxide deposits.

14. The method of claim 12 wherein step a comprises scanning the coherent radiation on the surface of the optic.

15. The method of claim 12 wherein the optic surface comprises a multilayer reflective film.

16. The method of claim 15 wherein the multilayer reflective film comprises about 10 to 200 layer pairs.

17. The method of claim 16 wherein the layer pairs have a periodicity of 2 nm to 100 nm.

18. The method of claim 15 wherein the multilayer reflective film comprises alternating layers of molybdenum and silicon.

19. The method of claim 11 which employs a laser to generate the coherent radiation.

20. An apparatus for detecting substrate surface contaminants containing carbon deposits and/or oxide deposits that comprises: (a) a source of radiation such that (i) the intensity of the detection radiation that is reflected from the carbon deposits is lower than the reflectance intensity of detection radiation that is reflected from a bare surface of the substrate, which does not contain either carbon or oxide deposits and (ii) the intensity of the detection radiation that is reflected from the oxide deposits is higher than the intensity of detection radiation that is reflected from the bare surface; (b) means for measuring the intensity of radiation that is reflected from the substrate surface and to a generate signal that corresponds to the intensity of the radiation measured; and (c) means for correlating the signal to the presence of the carbon deposits and/or oxide deposits.

21. The apparatus of claim 20 wherein the means for correlating the signal provides the thicknesses of the carbon deposits and/or oxide deposits.

22. The apparatus of claim 20 further comprising means for scanning the substrate surface so that the radiation is directed to a plurality of regions on the substrate surface.

23. The apparatus of claim 20 wherein the source of radiation is a laser.

24. The apparatus of claim 20 wherein the radiation is coherent radiation with a wavelength of about 633 nm.

25. The apparatus of claim 20 wherein the substrate is an optic that reflects extreme ultraviolet radiation.

26. The apparatus of claim 25 wherein the optic includes a multilayer reflective film.

27. The method of claim 26 wherein the multilayer reflective film comprises alternating layers of molybdenum and silicon.

* * * * *